United States Patent
Singh

(10) Patent No.: US 10,542,549 B2
(45) Date of Patent: Jan. 21, 2020

(54) WIRELESS CHANNEL ALLOCATION AMONGST MULTIPLE BASE STATIONS

(71) Applicant: Charter Communications Operating, LLC, St. Louis, MO (US)

(72) Inventor: Lakhbir Singh, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 15/791,653

(22) Filed: Oct. 24, 2017

(65) Prior Publication Data

US 2019/0124665 A1 Apr. 25, 2019

(51) Int. Cl.
  *H04W 16/04* (2009.01)
  *H04W 72/04* (2009.01)

(52) U.S. Cl.
  CPC ....... *H04W 72/0486* (2013.01); *H04W 16/04* (2013.01)

(58) Field of Classification Search
  CPC ..... H04W 16/02; H04W 16/14; H04W 28/00; H04W 28/02; H04W 28/16; H04W 16/04; H04W 72/0486
  See application file for complete search history.

(56) References Cited

U.S. PATENT DOCUMENTS

| | | | | |
|---|---|---|---|---|
| 6,418,148 B1* | 7/2002 | Kumar | ............... | H04W 72/0413 370/330 |
| 7,245,635 B2* | 7/2007 | Mo | .................... | H04L 43/0876 370/252 |
| 8,811,887 B2* | 8/2014 | Dottling | ................ | H04W 28/08 343/793 |
| 2003/0133415 A1* | 7/2003 | Kim | ...................... | H04B 7/2637 370/235 |
| 2005/0147123 A1* | 7/2005 | Asthana | .............. | H04W 72/044 370/469 |
| 2008/0025338 A1* | 1/2008 | Gorokhov | ............. | H04L 1/1819 370/441 |
| 2013/0077554 A1* | 3/2013 | Gauvreau | ............... | H04L 5/001 370/312 |
| 2016/0183247 A1* | 6/2016 | Syed | ...................... | H04B 7/212 370/337 |
| 2016/0198360 A1* | 7/2016 | Smith | ............... | H04W 28/0289 |
| 2017/0265116 A1* | 9/2017 | McCann | ............... | H04W 36/30 |

* cited by examiner

*Primary Examiner* — Jean A Gelin
(74) *Attorney, Agent, or Firm* — Armis IP Law, LLC

(57) ABSTRACT

According to one configuration, a base station controller monitors use of multiple wireless channels amongst multiple wireless base stations operating in a wireless network environment. In response to detecting under allocation of wireless channels between a first wireless base station and a first group of communication devices, the base station control allocates a supplemental wireless channel to the first wireless base station. In one embodiment, the base station controller de-allocates a wireless channel from a second wireless base station and assigns the de-allocated wireless channel to the first wireless base station as the supplemental wireless channel. The base station controller then transmits a channel allocation communication to the first wireless base station, the channel allocation communication indicating an identity of the supplemental wireless channel allocated for use by the first wireless base station.

25 Claims, 13 Drawing Sheets

WIRELESS CHANNEL ALLOCATION AMONGST MULTIPLE BASE STATIONS

BACKGROUND

In general, and as well known, the available wireless frequency spectrum is split up into many different bands and is used for many different purposes.

For example, some portions of the available wireless spectrum are sold or licensed to operators of private radio transmission services (such as, cellular telephone operators or broadcast television stations); other portions of the available wireless spectrum (non-licensed portion) are allocated for general authorized access users; yet other portions of the available wireless spectrum are allocated for use by the government (military).

Typically, management of the wireless frequency spectrum includes breaking up a dedicated portion of the wireless frequency spectrum into one or more channels. In certain instances, such as when a respective band supports wireless communications amongst cell phone subscribers, the channels in a dedicated band are allocated for use between a wireless base station (such as a cell phone tower) and a corresponding communication device (such as a cell phone device) to support respective wireless communications. Communications over multiple adjacent channels helps to avoid interference amongst the respective channels in a band.

A newly proposed type of wireless band (such as a shared or so-called multi-tiered) wireless band between 3.550 MHz and 3.700 MHz band, a.k.a., Citizen Band Radio Spectrum band) is shared by multiple different types of entities including government users (such as the military), licensed users, and non-licensed users. The CBRS band is a tiered radio band shared by multiple different types of users. Availability of channels in the CBRS band dynamically changes depending on use of the spectrum by higher priority entities.

It has been proposed that non-licensed users (i.e., the general authorized access users) in the band are afforded lowest priority and can be notified, at any time, to discontinue using a portion of the band during instances in which the band is needed for alternative purposes by a higher priority entity such as an incumbent user (government or military user).

BRIEF DESCRIPTION OF EMBODIMENTS

Embodiments herein include providing expanded allocation control capability in a network environment to support more efficient use of available wireless channels.

More specifically, in one embodiment, a wireless base station controller (such as a element management system) monitors use of multiple wireless channels amongst multiple wireless base stations operating in a wireless network environment. Assume that the wireless network includes at least a first wireless base station in communication with a first group of communication devices and a second wireless base station in communication with a second group of communication devices. The network can include any number of wireless base stations.

In one embodiment, the first wireless base station and the second wireless base station provide partially or fully overlapping wireless coverage to respective communication devices. Thus, the wireless base stations potentially interfere with each other if they use the same wireless channels.

During operation and monitoring, the base station controller (occasionally, periodically, etc.) receives first feedback (such as from the first wireless base station); the first feedback indicates performance of the first wireless base station and its ability to support first communications with the first group of communication devices. The base station controller receives second feedback (such as from the second wireless base station); the second feedback indicates performance of the second wireless base station and its ability to support second communications with the second group of communication devices.

The base station controller analyzes the first feedback and the second feedback. Assume that based on the first feedback, the base station controller identifies that the first wireless base station is currently not allocated a sufficient number of wireless channels to support wireless communications between the first wireless base station and the first group of communication devices. Based on the second feedback, and current allocation of wireless channels to the second wireless base station, assume that the base station controller detects over allocation of wireless channels to the second wireless base station. In other words, the second wireless base station is assigned too many wireless channels given an amount of data (payload) that needs to be conveyed between the second wireless base station and corresponding client devices. In such an instance, to accommodate the first wireless base station experiencing the congestion condition, via transmission of a channel de-allocation communication to the second wireless base station, the base station controller de-allocates a respective wireless channel currently assigned for use by the second wireless base station.

Note that de-allocation of the respective channel from the second wireless base station may be contingent upon the base station controller detecting that a set of remaining allocated one or more wireless channels still assigned to the second wireless base station is sufficient to support communications with a second group of communication devices above a performance threshold. Thus, de-allocation of the channel from the second wireless base station may not have any effect on the ability of the second wireless base station to communicate with the respective second wireless group of communication devices.

Note that, in accordance with further embodiments, de-allocation may also be contingent upon the base station controller detecting that no alternative wireless channels are available (free and not currently used by any wireless base station) to allocate to the first wireless base station.

In one embodiment, wireless channels allocated and de-allocated in the wireless network to the wireless base stations are channels from the CBRS spectrum (3.55 GHz to 3.7 GHz).

In accordance with further embodiments, the base station controller as discussed herein is in communication with a wireless spectrum controller of a so-called Spectrum Access System (SAS) that manages a wireless network environment. In one embodiment, the spectrum controller is an advanced radio spectrum coordinator configured to protect different tiers of users in a shared, multi-tier spectrum such as the CBRS band. The spectrum controller dynamically controls (such as based on feedback from one or more sources) which of the one or more channels in the CBRS band are available at any particular time for use by the wireless base stations. As a result, both the spectrum controller and the base station controller provide shared use of the 150 MHz of CBRS spectrum amongst multiple types of users.

In one instance, the spectrum controller maintains a database of all CBRS radio base stations including their corresponding tier status, geographical location, and other pertinent information. The spectrum controller uses the database to coordinate frequency usage and transmit power assignments, protecting the band from potential interference. In one embodiment, the base station controller as discussed herein communicates with the spectrum controller (SAS) for permission to determine whether a respective wireless channel can be allocated for further use in the network environment. Assume that the spectrum controller provides permission to use the de-allocated channel (from the second wireless base station as discussed above) in a particular geographical region in which the first wireless base station and the second wireless base station reside.

In furtherance of the above example, in response to detecting the under allocation (as indicated by the first feedback from the first wireless base station) of channels between the first wireless base station and a first group of communication devices, the base station controller assigns a supplemental wireless channel (such as the de-allocated wireless channel previously allocated to the second wireless base station) to the first wireless base station. To allocate the channel to the first wireless base station, the base station controller transmits a channel allocation communication to the first wireless base station indicating an identity of a supplemental wireless channel that is assigned for use by the first wireless base station to accommodate the high bandwidth needs of the first wireless base station.

Accordingly, a base station controller as discussed herein monitors respective bandwidth loads associated with each of multiple wireless base stations in a network environment. Based on availability of channels as indicated by spectrum controller (or SAS), the base station controller dynamically allocates new channels or de-allocates/re-allocates channels amongst the wireless base stations to accommodate changes in load in a multiple-tier shared spectrum.

Note that the wireless base stations can be configured to communicate with communication devices in accordance with any suitable communication protocol. In one embodiment, both the first wireless base station and the second wireless base station communicate with respective communication devices via LTE (Long Term Evolution) communications. In such an instance, the base station controller as discussed herein allocates channel from the CBRS band; the wireless base stations use the allocated wireless channels to communicate with corresponding one or more mobile communication devices via a wireless protocol such as LTE communications.

These and other more specific embodiments are disclosed in more detail below.

Note that any of the resources as discussed herein can include one or more computerized devices, mobile communication devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (such as a computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, hardware, device/devices, etc., each of which support one or more operations as discussed herein.

One embodiment herein includes a computer readable storage medium and/or system having instructions stored thereon to facilitate allocation of wireless channels in a network environment. The instructions, when executed by computer processor hardware, cause the computer processor hardware (such as base station controller) to: monitor use of multiple wireless channels by multiple wireless base stations operating in a wireless network environment, the multiple wireless base stations including a first wireless base station and a second wireless base station; in response to detecting under allocation of wireless channels between the first wireless base station and a first group of communication devices, allocate a supplemental wireless channel to the first wireless base station; and transmit a channel allocation communication to the first wireless base station, the channel allocation communication indicating an identity of the supplemental wireless channel allocated for use by the first wireless base station.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of allocating wireless channels of a shared spectrum amongst multiple base stations. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
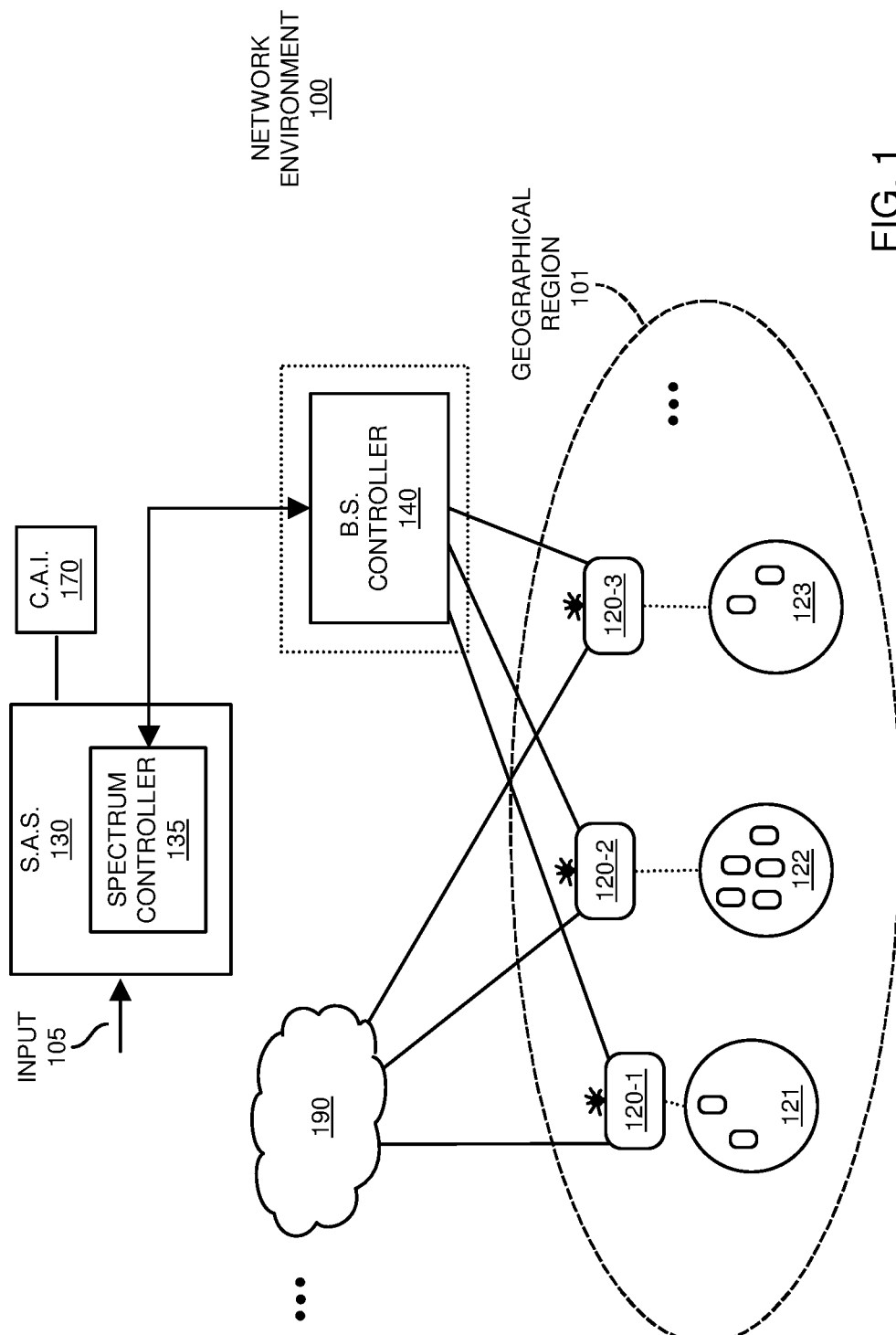
FIG. 1 is an example diagram illustrating a base station controller and allocation/de-allocation of wireless channels to multiple base stations according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

According to embodiments herein, a base station controller monitors use of multiple wireless channels amongst multiple wireless base stations operating in a wireless network environment; the multiple wireless base stations including a first wireless base station and a second wireless base station. In response to detecting under allocation of wireless channels between the first wireless base station and a first group of communication devices, the base station control allocates a supplemental wireless channel to the first wireless base station. In one embodiment, the base station controller de-allocates a wireless channel from the second wireless base station and allocates the de-allocated wireless channel as the supplemental wireless channel. The base station controller then transmits a channel allocation communication to the first wireless base station; the channel allocation communication indicates an identity of the supplemental wireless channel allocated for use by the first wireless base station. These and further embodiments are discussed below.

Now, more specifically, FIG. 1 is an example diagram illustrating a network environment according to embodiments herein.

As shown, network environment 100 (such as a wireless network) includes base station controller 140 and multiple wireless base stations 120 (namely, wireless base station 120-1, wireless base station 120-2, wireless base station 120-3, etc.).

As shown, each of the wireless base stations 120 resides in geographical region 101. In one embodiment, each of the wireless base stations 120-1, 120-2, and 120-3 can be configured to provide fully or partially overlapping wireless coverage to respective sets of communication devices 121, 122, and 123.

In other words, in one embodiment, wireless base station access point 120-1 can support wireless communications with any of communication devices 121, 122, 123 because such devices are within wireless range of wireless base station 120-1; wireless base station 120-2 can support wireless communications with any of communication devices 121, 122, 123 because such devices are within wireless range of wireless base station 120-2; wireless base station 120-3 can support wireless communications with any of communication devices 123, 122, 123 because such devices are within wireless range of wireless base station 120-3; etc.

The wireless base stations 120 support wireless communications in accordance with any suitable wireless protocol.

In one embodiment, the aggregation of wireless base stations 120 in the geographical region 101 is a so-called small cell cluster of wireless base stations. As further described herein, the wireless base stations 120 share use of the same band of wireless spectrum.

By way of non-limiting example embodiment, each of the wireless base stations 120 (a.k.a., long or short range cellular base stations) supports wireless communications in accordance with any of one or more wireless protocols including, for example, any of LTE (Long Term Evolution) standards, OFDMA (Orthogonal Frequency Division Multiple Access), etc.

In one embodiment, the wireless base stations 120 are allocated wireless channels available from a multi-tier radio band such as the CBRS band. However, note that the base station controller 140 can be configured to allocate wireless channels from any suitable wireless spectrum.

Note that the multi-tier band or multi-tier spectrum (such as between 3.55 and 3.70 MHz or other suitable band) allocated from base station controller 140 for use by the wireless base stations 120 can be split into multiple channels (such as 10 MHz channels, 20 MHz channels, etc.).

The wireless base stations 120 share use of the same one or more available allocated channels in the shared band t(multi-tier spectrum in which different users in the multi-tier spectrum have different assigned priority levels). Via allocated one or more channels, the wireless base stations provide wireless connectivity to respective mobile communication devices (such as phones, computer devices, etc.). Accordingly, the wireless base stations 120 share use of one or more available wireless channels available in a shared wireless multi-tier spectrum.

In one embodiment, as further discussed below, the base station controller 140 monitors respective bandwidth/traffic/device loads associated with each of multiple wireless base stations in network environment 100. Based on availability of channels as indicated by spectrum controller 135 (of spectral access system 130), the base station controller 140 dynamically allocates new channels or de-allocates/re-allocates channels amongst the wireless base stations 120 to accommodate changes in bandwidth needs.

In accordance with further embodiments, each of the wireless base stations 120 provides wireless coverage in a so-called small cell region within geographical region 101. As mentioned, the wireless coverage provided by each wireless base station can be fully overlapping or partially overlapping with respect to each other. For example, as previously discussed, any of one or more of the wireless base stations 120 can be configured to provide wireless coverage in the whole geographical region 101, a less-than-all portion of the geographical region 101, etc.

For example, in one non-limiting example embodiment, the channels allocated for use by the multiple wireless base stations (and potentially other entities) resides in the wireless spectrum such as between 3.550 MHz and 3.700 MHz band. Spectrum controller 135 of the spectrum access system 130 determines which channels in the multi-tier spectrum are available for allocation by the base station controller 140 at any given time.

The CBRS band is shared by multiple users including shared by government users (high priority users such as the military or government), licensed users (such as mid priority users that pay a fee to use wireless channels), and non-licensed users (low priority users that use a general authorized access tier).

In this example embodiment, the non-licensed users (general authorized access users, general public) are afforded lowest priority is notified when to discontinue using any or all of a portion of the band during instances in which channels in the band are needed for alternative purposes by higher priority entities.

As further shown, during operation, each of the wireless base stations 120 supports wireless communications with one or more corresponding communication devices using one or more allocated channels.

In one embodiment, the wireless base stations 120 provide respective users operating communication devices 121, 122, 123, etc., access through network 190 to a remote network such as the Internet or other communication devices.

As more specifically shown in FIG. 1, wireless base station 120-1 is in wireless communication with communication devices 121 via one or more allocated wireless channels; wireless base station 120-2 is in wireless communication with communication devices 122 via one or more allocated wireless channels; wireless base station 120-3 is in wireless communication with communication devices 123 via one or more allocated wireless channels; and so on.

In accordance with further embodiments, the spectrum controller 135 of spectral access system 130 produces channel availability information 170 associated with geographical region 101. Channel availability information 170 indicates which portions of the wireless spectrum (such as channels in the CBRS band) are currently available for current allocation.

Spectral access system 130 receives input 105 (such as from any suitable resource) indicating whether or not a respective high priority incumbent resource needs to use a portion of the shared wireless spectrum. Based on the received input 105, the bandwidth allocation management resource 160 dynamically updates the channel availability information 170 to accommodate the different users that may be using the wireless channels. An example illustrating how availability of different channels changes over time is shown in FIG. 2.

Figure 2:
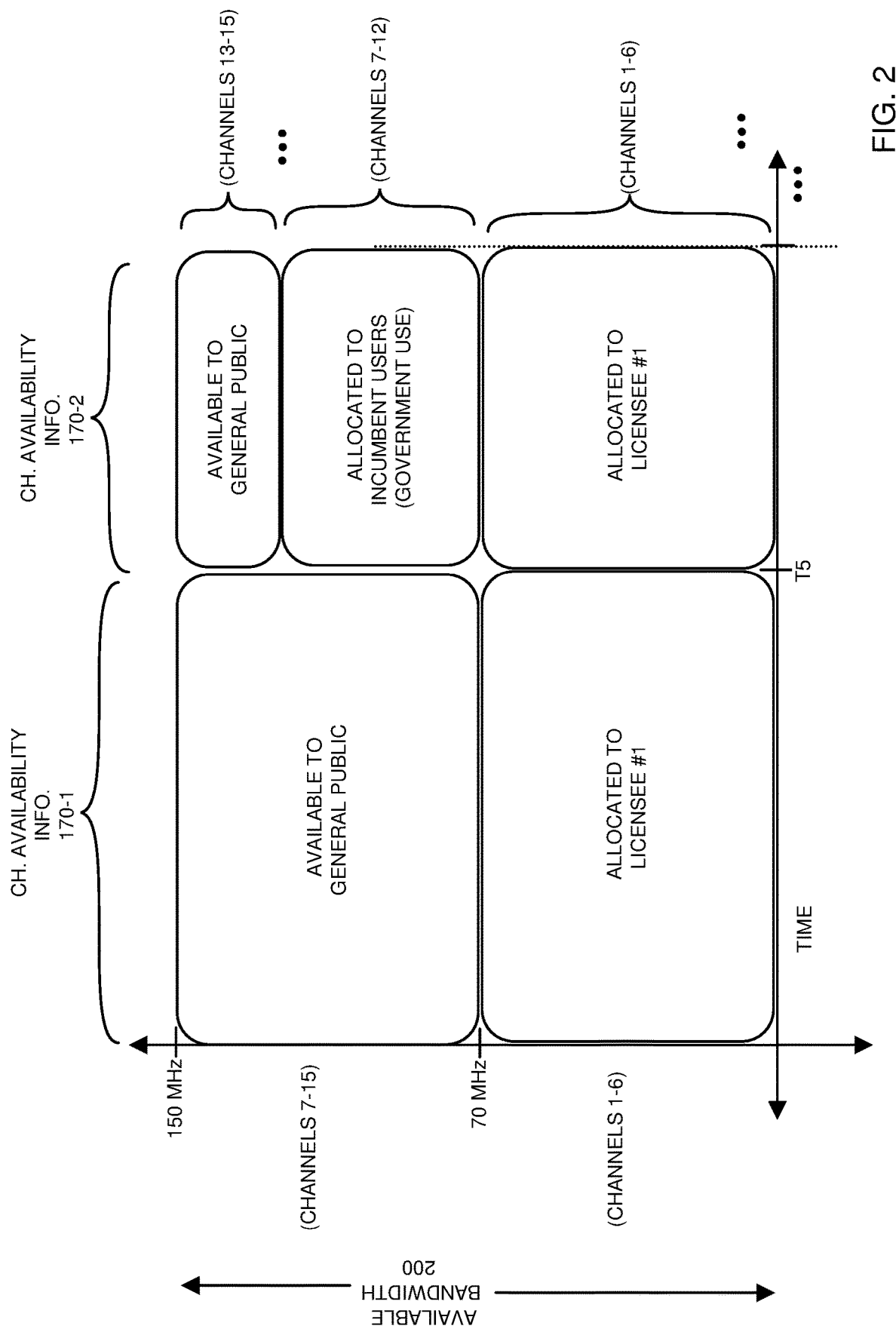
FIG. 2 is an example diagram illustrating how an available tiered spectrum of wireless channels dynamically changes over time according to embodiments herein.

FIG. 2 is an example diagram illustrating generation of dynamic channel allocation information indicating allocation of bandwidth at different tiers according to embodiments herein.

As previously discussed, spectral access system 130 keeps track, at any given time, which channels or portions of the multi-tier wireless spectrum or multi-tier radio band (such as CBRS band) are available in geographical region 101. If government use (a so-called incumbent user) is detected via input 105 (FIG. 1), certain channels are no longer available for use as shown in the content access information 170-1 and 170-2 as shown in FIG. 2.

In this example, the channel availability information 170-1 (an instance of content access information 170) indicates that prior to time T5, channels 7-15 are available to the general authorized access users (general public or low priority users) for use; channels 1-6 are available for use by licensee #1.

As further shown, at or around time T5, assume that the spectral access system 130 receives input 105 indicating use of a portion (channels 7-12) of the spectrum by an incumbent user such as the government. In such an instance, the spectral access system 130 updates the channel availability information such that the channel allocation information 170-2 indicates that only channels 13-15 are allocated as being available to the general authorized access users; channels 7-12 are assigned for use by an incumbent entity requesting use or actually using the channels; wireless channels 1-6 are allocated for use by a first licensee. Thus, after time T5, the wireless channels 7-12 are no longer available for use by the low priority users (i.e., general authorized access users).

This illustrates the dynamic availability of different wireless channels bandwidth 210 as shared in network environment 100. If base station controller 140 allocates use of any channels 7-15 to any of base stations 120, then the base station controller 140 must de-allocate use of such wireless channels during conditions in which a higher priority so-called incumbent user takes over use of wireless channels 7-12.

Figure 3:
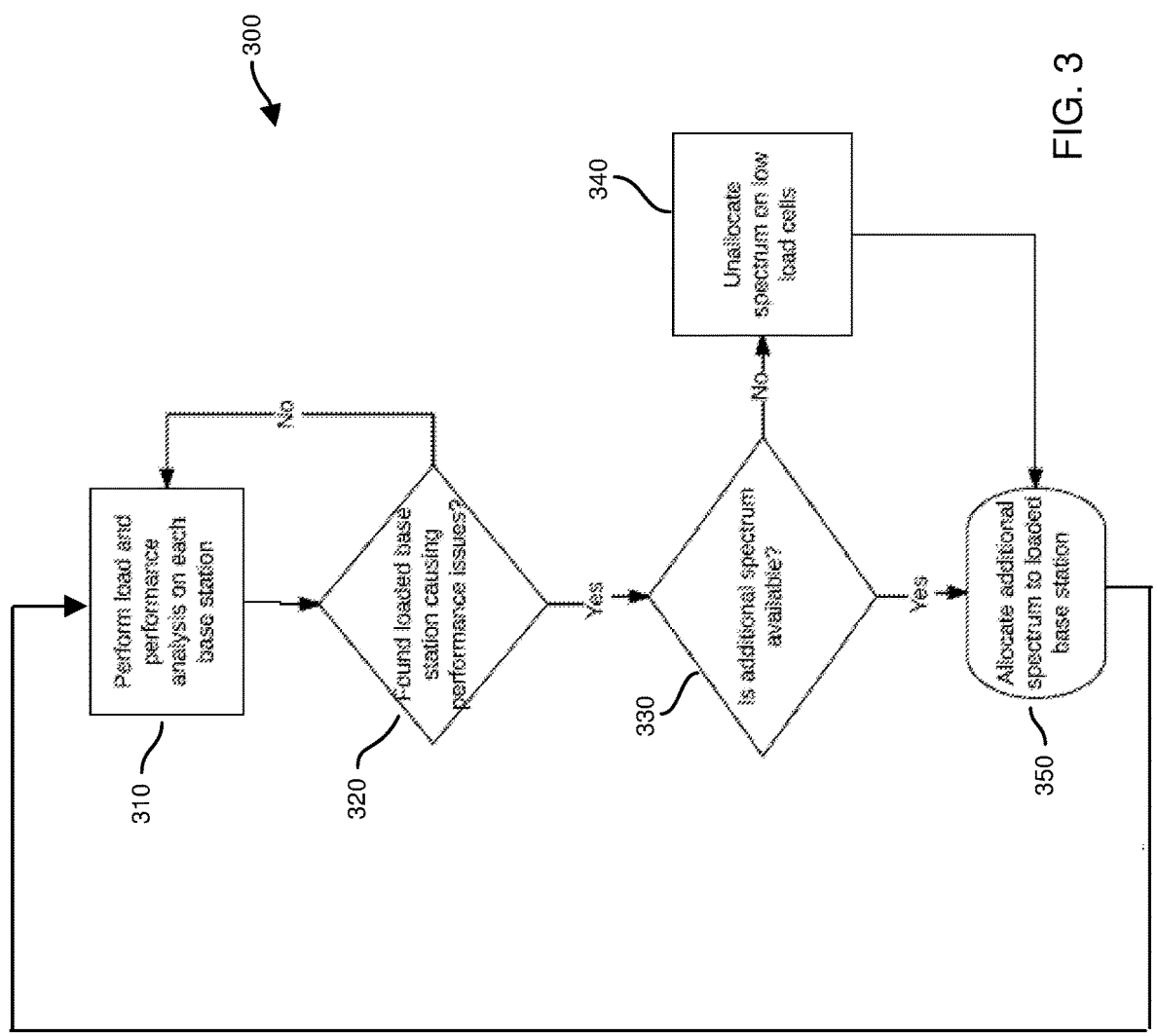
FIG. 3 is an example diagram illustrating a method (flowchart) according to embodiments herein.

FIG. 3 is an example diagram illustrating general operations of managing wireless channels according to embodiments herein.

As shown in flowchart 300, in processing operation 310, the base station controller 140 performs load and performance analysis with respect to each wireless base station 120.

At decision-processing operation 320, the base station controller 140 checks whether any of the wireless base stations 120 experiences communication performance issues (such as inability to convey data between itself and corresponding communication devices). If not, the base station controller 140 loops back to execution of processing operation 310.

If the base station controller 140 detects a wireless base station experiencing congestion due to a heavy load of traffic to corresponding communication devices, the base station controller 140 executes decision-processing operation 330.

In decision-processing operation 330, the base station controller 140 checks with the spectrum controller 135 of spectral access system 130 whether or not additional spectrum is available for allocation in the geographical region 101. If so, the base station controller 140 executes allocation-processing operation 350 in which the wireless base station controller 140 allocates additional available spectrum to the wireless base station experiencing congestion. If not, in processing operation 340, the base station controller 140 de-allocates one or more channels of spectrum assigned to one of the wireless base stations (such as a wireless base station that is least loaded or least congested in terms of conveying data traffic) in the geographical region 101. The base station controller 140 allocates this newly de-allocated (one or more wireless channels) to the wireless base station experiencing congestion (communication performance issues).

Subsequent to the execution of processing operation 350, the base station controller 140 continues operational flow by executing processing operation 310 again.

Execution of operations in flowchart 300 ensures that wireless channels are properly assigned to accommodate different bandwidth needs amongst the wireless base stations 120.

Figure 4:
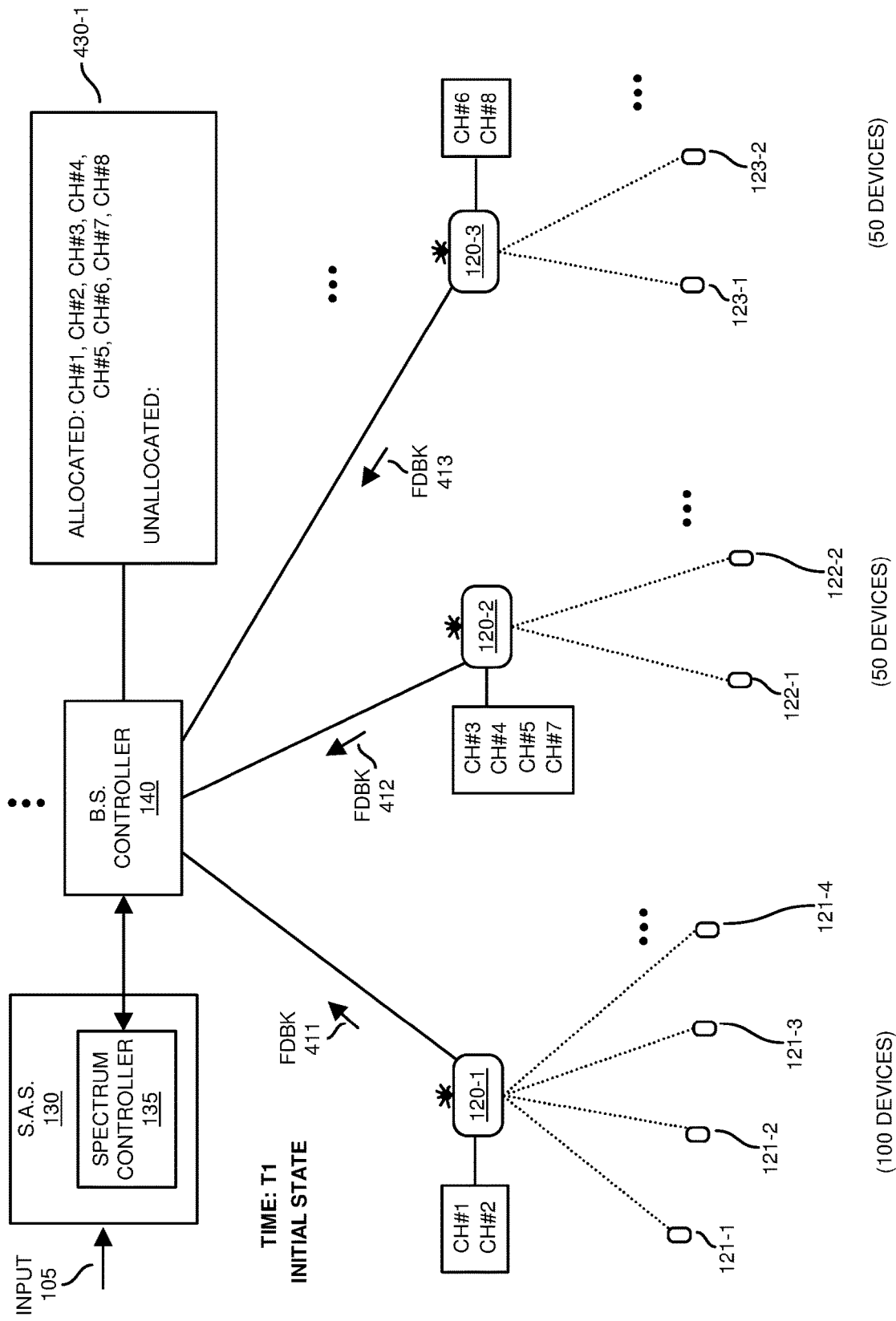
FIG. 4 is an example diagram illustrating a base station controller monitoring multiple base stations according to embodiments herein.

FIG. 4 is an example diagram illustrating monitoring of multiple base stations according to embodiments herein.

In this example embodiment, the base station controller 140 is in communication with a spectrum controller 135 of a so-called Spectrum Access System (SAS) that manages use of the multi-tier band in wireless network environment 100. In one embodiment, the spectrum controller 135 is an advanced radio spectrum coordinator configured to protect the different tiers of users in a shared, multi-tier spectrum such as CBRS band.

As previously discussed, the spectrum controller 135 dynamically controls which of the one or more channels in the multi-tier band are available at any particular time for use by the wireless base stations. In other words, as previously discussed, an incumbent user may be newly assigned use of certain channels in the multi-tier band. This results in de-allocation of those channels from being used in the network environment by the general public.

As further shown, in one embodiment, the wireless base station controller 140 monitors performance of multiple wireless base stations operating in a wireless network environment 100.

In this example, assume that the wireless base station 120-1 has been assigned channel #1 (CH #1) and channel #2 CH #2) to communicate with respective set of communication devices 121 (which includes communication device 121-1, communication device 121-2, communication device 121-3, communication device 121-4, etc.).

Assume that the wireless base station 120-2 has been assigned channel #3 (CH #3), channel #4 (CH #4), channel #5 (CH #5), and channel #7 (CH #7) to communicate with respective set of communication devices 122 (which includes communication device 122-1, communication device 122-2, etc.).

Assume that the wireless base station 120-3 has been assigned channel #6 (CH #6) and channel #8 (CH #8) to communicate with respective set of communication devices 123 (which includes communication device 123-1, communication device 122-3, etc.).

In one embodiment, the base station controller 140 (occasionally, periodically, etc.) receives feedback from the corresponding wireless base stations. The feedback indicates whether or not the corresponding wireless base station is assigned an appropriate number of wireless channels to handle current data traffic between the respective base station in the corresponding communication devices.

For example, as shown in FIG. 4, the base station controller 140 receives feedback 411 (such as from the first wireless base station 120-1). Assume that the first feedback 411 indicates performance of the first wireless base station 120-1 and the degree to which the first wireless base station 120-1 is able to support first communications with the first group of communication devices 121. Note that the received feedback 411 can be any suitable type of information. For example, the received feedback can be or include information such as one or more metrics indicating whether the currently assigned wireless channels #1 and #2 are sufficient to convey data between the wireless base station 120-1 and corresponding communication devices 121.

The base station controller receives second feedback 412 (such as from the second wireless base station 120-2); the second feedback 412 indicates performance of the second wireless base station 120-2 and a degree to which the second wireless base station 120-2 is able to support second communications with the second group of communication devices 122. The received feedback 412 can be or include information such as one or more metrics indicating whether the currently assigned wireless channels #3, #4, #5, and #7 are sufficient to convey data between the wireless base station 120-2 and corresponding communication devices 122.

The base station controller receives feedback 413 (such as from the third wireless base station 120-3); the feedback 413 indicates performance of the wireless base station 120-3 and a degree to which the wireless base station 120-3 is able to support communications with the third group of communication devices 123. The received feedback 413 can be or include information such as one or more metrics indicating whether the currently assigned wireless channels #6 and #8 are sufficient to convey data between the wireless base station 120-3 and corresponding communication devices 123.

Note again that the data included in the feedback from the wireless base stations 120 can be any suitable information or parameters (such as number of devices being provided connectivity, bandwidth needed to wirelessly communicate with respective devices, a degree of congestion, a current load of a respective base station, etc.) indicating whether a respective base station needs to be assigned additional one or more wireless channels.

The base station controller 140 analyzes the received feedback received from the multiple wireless base stations 120.

Assume that the feedback 413 indicates that wireless base station 120-3 is properly assigned channel #6 and channel #8.

Assume in this example embodiment that based on the first feedback 411, the base station controller 140 identifies that the first wireless base station 120-1 is currently not allocated a sufficient number of wireless channels (wireless base station 120-1 is only assigned channel #1 and channel #2) to support wireless communications between the first wireless base station 120-1 and the first group of communication devices 121 (100 devices).

Based on the second feedback 412, and current allocation of wireless channels (i.e., channel #3, channel #4, channel #5, and channel #7) to the second wireless base station 120-2, assume that the base station controller 140 detects over allocation of wireless channels to the second wireless base station 120-2. In other words, the second wireless base station 120-1 is assigned too many wireless channels for its current load of 50 devices.

Based on this received feedback, the base station controller 140 determines that it needs to de-allocate one or more wireless channels from the second base station 120-2 (because wireless base station 120-2 is assigned too many channels) and allocate them to wireless base station 120-1.

Note that de-allocation of the respective channel from the second wireless base station 120-2 may be contingent upon the base station controller 140 detecting that a set of remaining allocated one or more wireless channels still assigned to the second wireless base station are sufficient to support communications with a second group of communication devices above a performance threshold. In other words, the base station controller 140 detects that wireless base station 120-2 will be able to provide continued wireless service to its respective vacation devices 122 if it were only assigned channel #3 in channel #4. Thus, de-allocation of one or more channels such as wireless channel #5 and #7 from the second wireless base station 120-2 may not have any effect on the ability of the second wireless base station 120-2 to continue to communicate with the respective second wireless group of communication devices 122.

Note that, in accordance with further embodiments, de-allocation by the base station controller 140 may also be contingent upon the base station controller 140 detecting that no alternative wireless channels are available (free and not used by any wireless base station) to allocate to the first wireless base station 120-1. In this example embodiment, channel availability information 430 (list of channels available for use by the wireless base stations) indicates that all available wireless channels are allocated for use by the wireless base stations. This means that the base station controller 140 must de-allocate one or more channels from wireless base station 120-2 for allocation to wireless base station 120-1 to accommodate its heavy load of 100 devices.

Figure 5:
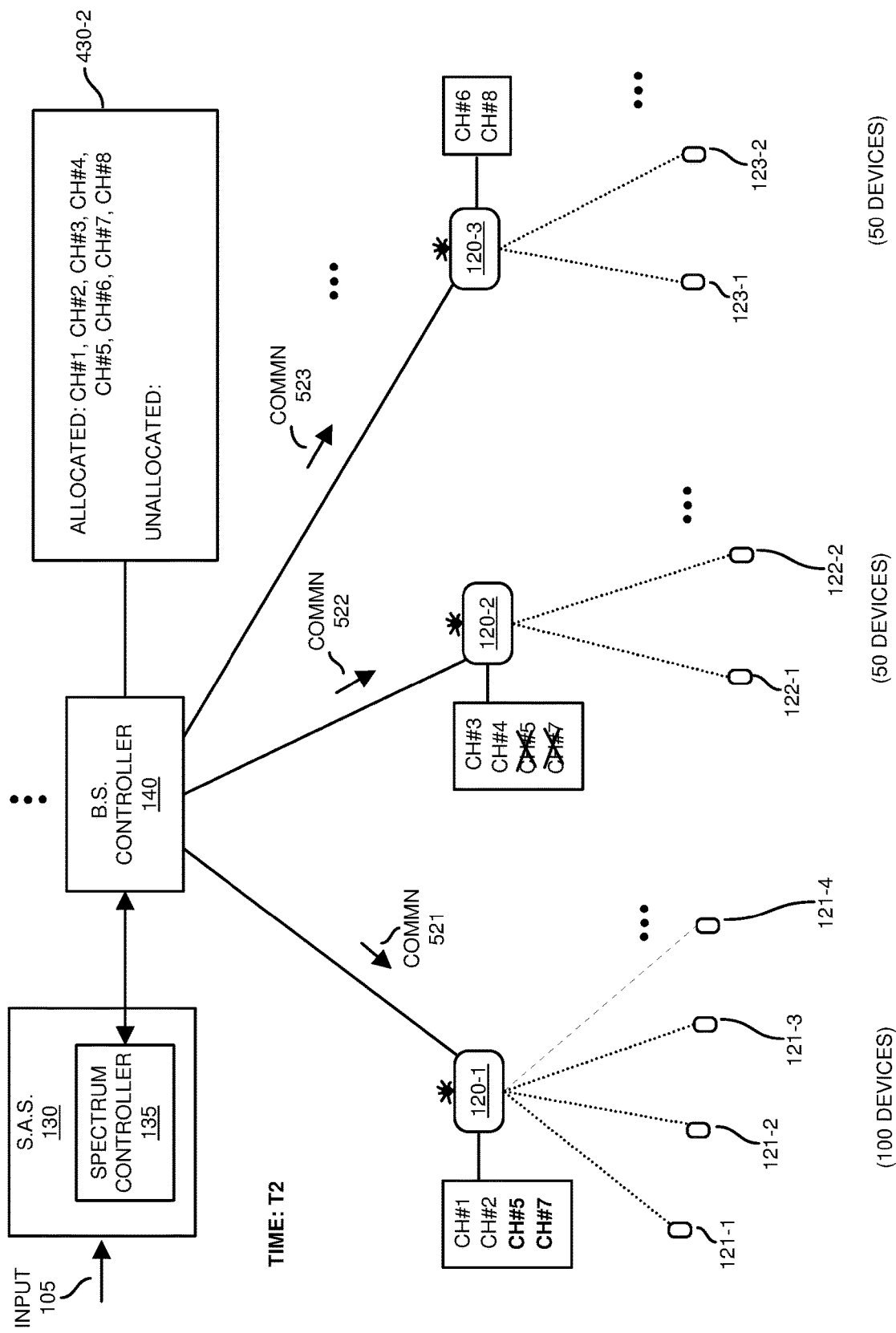
FIG. 5 is an example diagram illustrating de-allocation of one or more wireless channels from a second wireless base station and allocation of the de-allocated one or more wireless channels to a first wireless base station according to embodiments herein.

FIG. 5 is an example diagram illustrating de-allocation of one or more wireless channels from a second wireless base station and allocation of the de-allocated one or more wireless channels to a first wireless base station according to embodiments herein.

In furtherance of the above example, in response to detecting the over allocation of wireless channels to the wireless base station 120-2, the base station controller 140 transmits communication 522 to the base station 120-2. The communication 522 indicates that the wireless channel #5 and #7 are being de-allocated from further use by the wireless base station 120-2.

In response to detecting the under allocation of channels between the wireless base station 120-1 and a first group of communication devices 121 (as indicated by the feedback 411), the base station controller 140 assigns one or more supplemental wireless channels (such as the de-allocated wireless channels channel #5 and #7 previously de-allocated from the second wireless base station) to the wireless base station 120-1.

To allocate the channels #5 and #7 to the wireless base station 120-1, the base station controller 140 transmits a channel allocation communication 521 to the first wireless base station 120-1 indicating an identity of supplemental wireless channels #5 and #7 that are newly assigned for use by the wireless base station 120-1 to accommodate the high bandwidth needs of the first wireless base station 120-1 in network environment 100.

In one embodiment, the base station controller 140 can be configured to communicate with the spectral controller 135 to determine whether or not the de-allocation and subsequent reallocation of wireless channels is permissible.

In this example embodiment, subsequent to de-allocation and reallocation, wireless base station 120-1 is assigned and allocated wireless channel #1, #2, #5, #7 to accommodate its heavy load of 100 devices. Wireless base station 120-2 is assigned and allocated continued use of channel #3 and #4 to accommodate its load of 50 devices. Wireless base station 120-3 is assigned an allocated continued use of channel #6 and channel #8 to accommodate its load of 60 devices.

Accordingly, instead of requiring handoffs of a portion of communication devices 121 and corresponding wireless communication links from the wireless base station 120-1 to the wireless base station 120-2, embodiments herein include de-allocation of one or more channels from a lightly loaded wireless base station and then reassignment/reallocation of those one or more de-allocated wireless channels to a more heavily loaded wireless base station.

Figure 6:
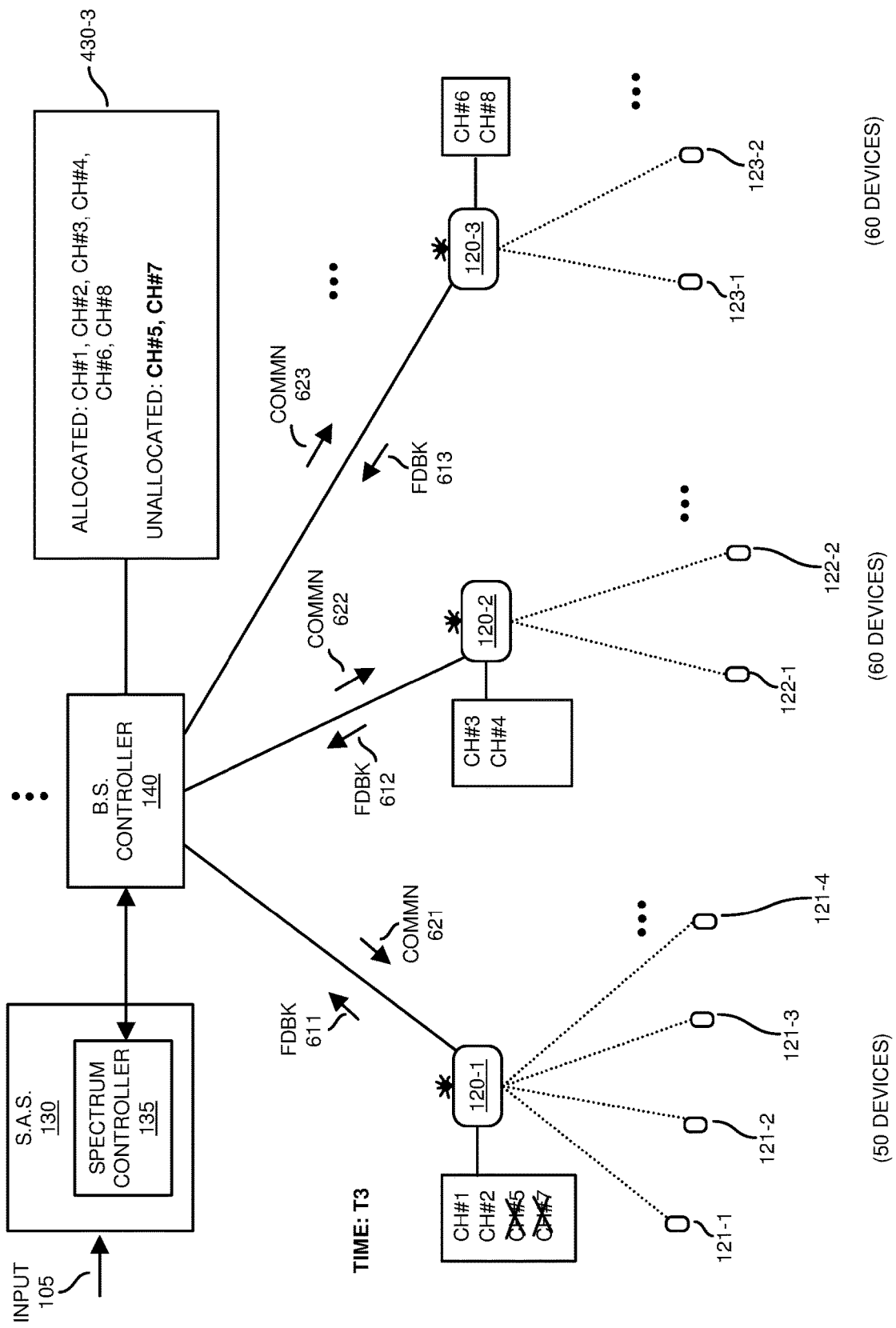
FIG. 6 is an example diagram illustrating de-allocation of wireless channels according to embodiments herein.

FIG. 6 is an example diagram illustrating de-allocation of wireless channels according to embodiments herein.

Note that further embodiments herein can include proactively de-allocating one or more wireless channels from a respective wireless base station in the event that they are no longer needed for use by that base station.

As an example, assume that the base station controller 140 receives feedback 611 indicating that wireless base station 120-1 requires fewer wireless channels to support the current mode of communication devices 121 (such as a drop to 50 devices, down from 100 devices as in FIG. 5). In such an instance, the base station controller 140 generates communication 621 to the wireless base station 120-1. The communication 621 indicates the de-allocation of channel #5 and #7 from further use by the wireless base station 120-1. In response to receiving the communication 621, the wireless base station 120-1 uses only channel #1 and #2 to communicate with the corresponding communication devices 121.

As further shown, the base station controller 140 updates its channel availability information 430-3 to indicate that a wireless channel #5 and #7 are not allocated to any wireless base station in network environment 100.

In a similar manner, the base station controller 140 receives feedback 612 from wireless base station 120-2. Because the wireless channels #3 and #4 are needed to provide continued wireless connectivity between wireless base station 120-2 and corresponding communication devices 122, the base station controller 140 makes no changes to the allocation of channel #3 and #4 to the wireless base station 120-2. In one embodiment, the base station controller 140 transmits communication 622 to the wireless base station 120-2. The communication 622 indicates (to the wireless base station 120-2) that there is no change to allocation of wireless channels #3 and #4 to the wireless base station.

Yet further, the base station controller 140 receives feedback 613 from wireless base station 120-3. Because the wireless channels #6 and #8 are needed to provide continued wireless connectivity between wireless base station 120-3 and corresponding communication devices 123, the base station controller 140 makes no changes to the allocation of channel #6 and #8 to the wireless base station 120-3. In one embodiment, the base station controller 140 transmits communication 623 to the wireless base station 120-3. The communication 623 indicates (to the wireless base station 120-3) that there is no change to allocation of wireless channels #6 and #8 to the wireless base station.

Figure 7:
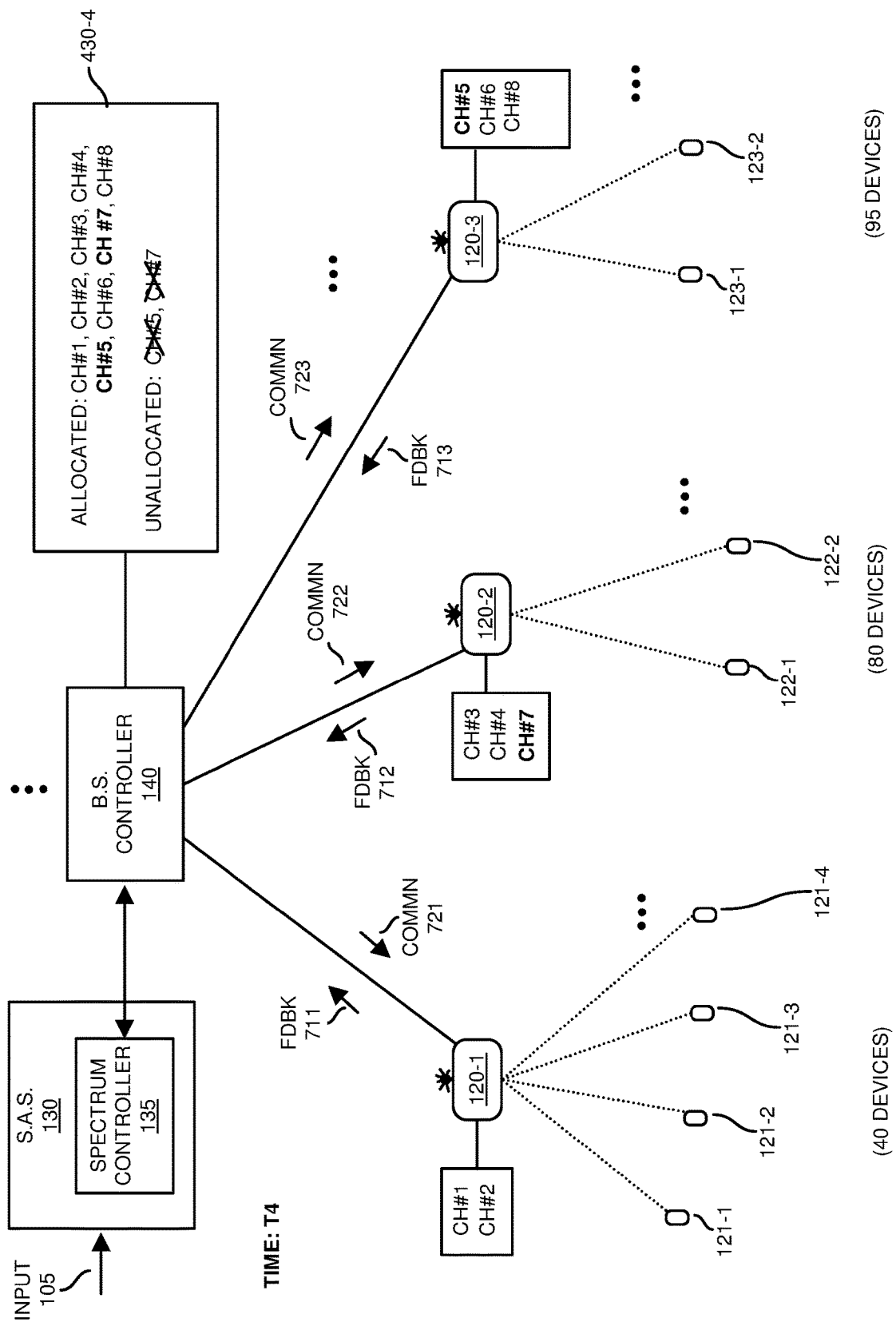
FIG. 7 is an example diagram illustrating re-allocation of wireless channels according to embodiments herein.

FIG. 7 is an example diagram illustrating re-allocation of wireless channels on an as needed basis according to embodiments herein.

As previously discussed, the device load carried by each the base stations 120 can dynamically change over time. With respect to the load as indicated in FIG. 6, base station 120-1 supports 40 communication devices 121 as shown in FIG. 7. However, at time T4 in FIG. 7, base station 120-2 now supports 80 devices instead of 60 devices; base station 120-3 supports 95 devices instead of 60 devices.

In one embodiment, the base station controller 140 receives notification of changes to current load conditions via respective feedback. For example, via feedback 711, the base station controller 140 detects that the wireless base station 120-1 is allocated a proper number of wireless channels to accommodate the corresponding communication devices 121 (40 devices). In response to receiving feedback 711, the base station controller 140 transmits communications 721 to the wireless base station 120-1. The communication 721 indicates that there is no change to allocation or assignment of wireless channels to wireless base station 120-1. Accordingly, wireless base station 120-1 continues to use wireless channel #1 and #2 to support wireless connectivity with the communication devices 121.

Via feedback 712, the base station controller 140 detects that the wireless base station 120-2 is initially allocated too few wireless channels (initially channel #3 and #4) to accommodate the corresponding communication devices 122 (total of 80 devices). In response to receiving feedback 712, and detecting that currently assigned channel #3 and #4 are insufficient to support the current load of 80 devices, the base station controller 140 performs a reallocation and transmits communications 722 to the wireless base station 120-2. The communication 722 indicates that additional channel #7 has been newly assigned and allocated to wireless base station 120-2 for communicating with the heavy load of 80 communication devices 122. Subsequent to allocation, the wireless base station 120-2 uses the wireless channels #3, #4, and #7 to support wireless connectivity between the wireless base station 120-2 and the communication devices 122.

Via feedback 713, the base station controller 140 detects that the wireless base station 120-3 is initially allocated too few wireless channels (initially channel #6 and #8) to accommodate the corresponding communication devices 123 (total of 95 devices). In response to receiving feedback 713, and detecting that channel #6 and #8 are insufficient to support the current load of 95 devices, the base station controller 140 performs a reallocation and transmits communications 723 to the wireless base station 120-3. The communication 723 indicates that additional channel #5 has been assigned and allocated to wireless base station 120-3 for communicating with the heavy load of 95 communication devices 123. Subsequent to allocation, the wireless base station 120-3 uses the wireless channels #5, #6, and #8 to support wireless connectivity between the wireless base station 120-3 and the communication devices 123.

To keep track of channel allocation, the base station controller 140 updates its channel availability information 430-4 to indicate that wireless channels #5 and #7 are now allocated to wireless base stations.

Figure 8:
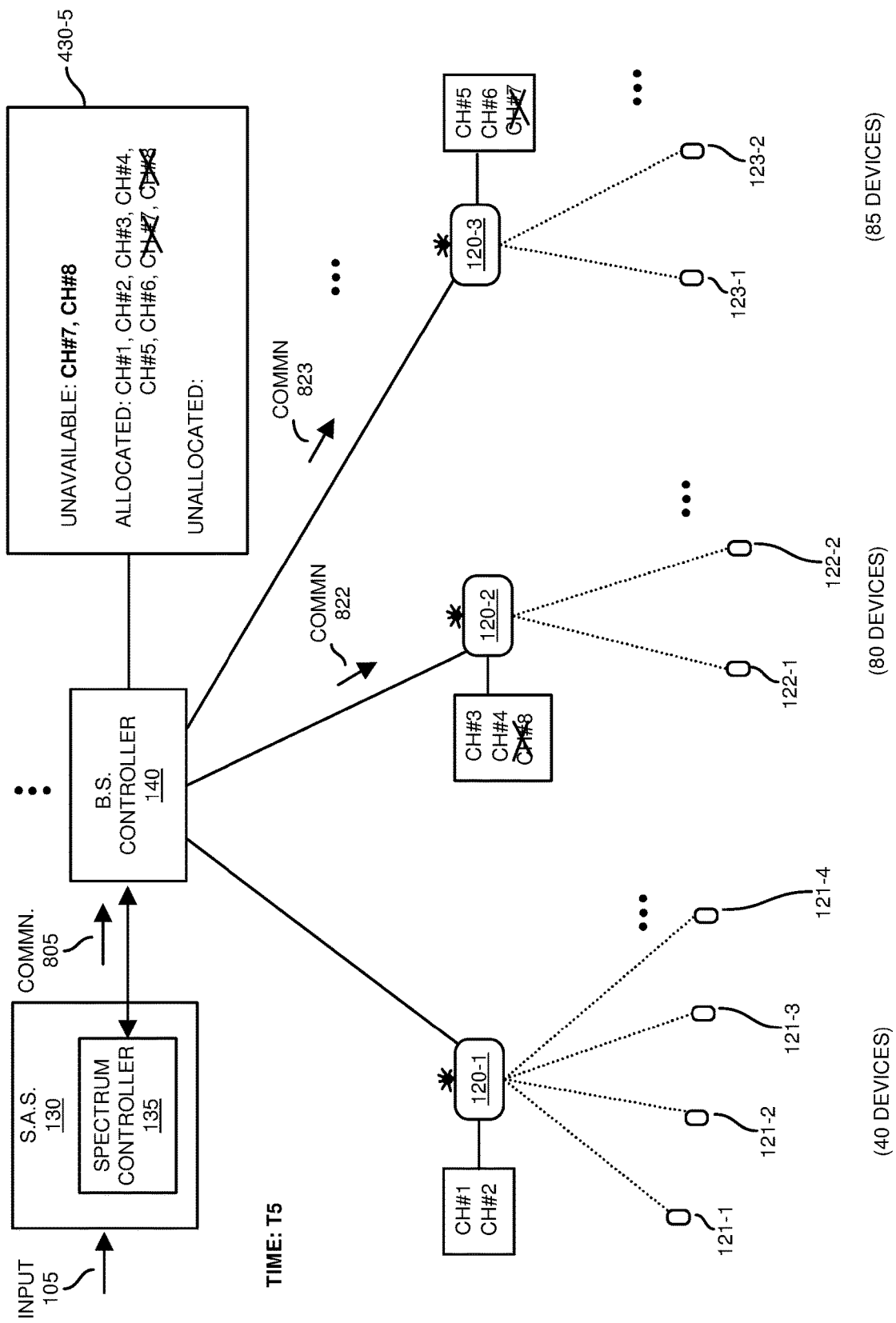
FIG. 8 is an example diagram illustrating change in availability of wireless channels and de-allocation according to embodiments herein.

FIG. 8 is an example diagram illustrating change in availability of wireless channels according to embodiments herein.

In one embodiment, the base station controller 140 receives notification of changes to current channel availability based on feedback from the spectral access system 130. For example, assume that the spectrum controller 135 receives input 105 indicating that an incumbent user having a highest assigned priority in the multi-tier spectrum is now using or plans to use channels #7 and #8 of the multi-tier band. In such an instance, channel #7 and channel #8 are no longer available for use by wireless base stations 120.

Base station controller 140 receives communication 805 from spectrum controller 135. In the communication 805 indicates that the channel #7 and channel #8 in the multi-tier band are no longer available for use by the wireless base stations 120 due to intended or actual use of the channels by the incumbent user (which occurs at around time T5). In such an instance, the base station controller 140 generates and transmits communication 822 to the wireless base station 120-2. The communication 822 indicates that channel #8 has been de-allocated from further use by the wireless space station 120-2. Accordingly, wireless base station 120-2 continues to support communications with the corresponding communication devices 122 using only channels #3 and #4.

Additionally, in response to receiving communication 805 indicating that channel #7 and channel #8 are no longer available for use, the base station controller 140 generates and transmits communication 823 to the wireless base station 120-3. The communication 823 indicates that channel #7 has been de-allocated from further use by the wireless base station 120-3. Accordingly, wireless base station 120-3 continues to support communications with the corresponding communication devices 123 using only channels #5 and #6.

To keep track of channel allocation, the base station controller 140 updates its channel availability information 430-5 to indicate that wireless channels #7 and #8 are now unavailable for use and that channels #1, #2, #3, #4, #5, and #6 are all allocated for use by wireless base station 120.

In such an instance, subsequent to allocating channel #7 and channel #8, assume that the wireless base stations 120 carry different loads. For example, wireless base station 120-1 supports communications with 40 communication devices 121; wireless base station 120-2 supports communications with 80 communication devices 122; wireless base station 120-3 supports communications with 85 communication devices 123.

In one embodiment, since no extra wireless channels are available to support an increased load conductive, if desired, and to more evenly distribute the load of devices across the wireless base stations 120, the base station controller 140 initiates a handoff of 10 of the communication devices 122 from wireless base station 120-2 to wireless base station 120-1; base station controller 140 initiates a handoff of 15 of the communication devices 123 from wireless base station 120-3 to wireless base station 120-1. The result of the handoffs is shown in FIG. 9.

Figure 9:
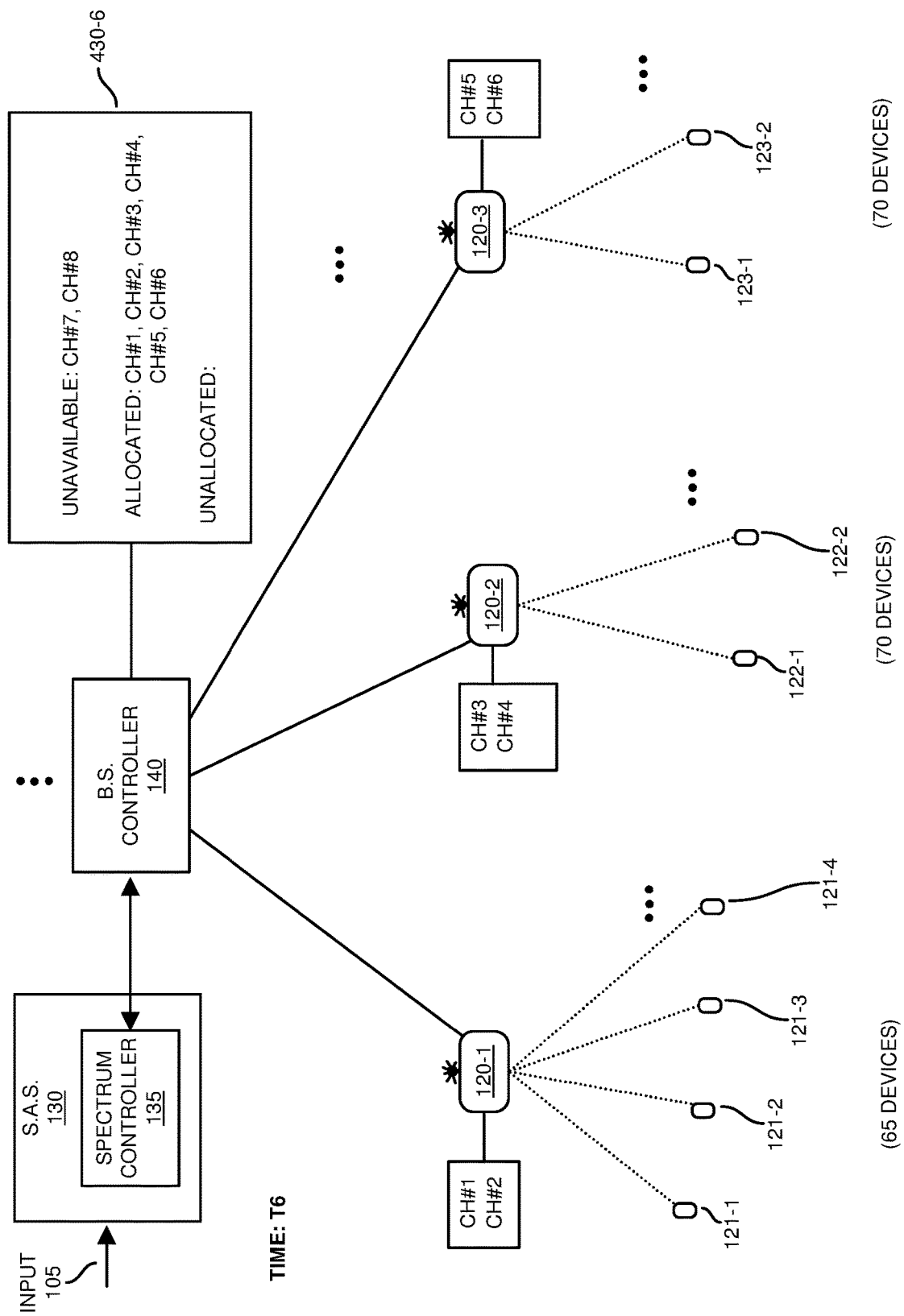
FIG. 9 is an example diagram illustrating a current allocation of wireless channels according to embodiments herein.

FIG. 9 is an example diagram illustrating de-allocation of wireless channels due to change in wireless channel availability according to embodiments herein.

Subsequent to performing handoffs, as shown in FIG. 9, the wireless base station 120-1 supports communications with 65 communication devices 121; wireless base station 120-2 supports communications with 70 communication devices 122; and wireless base station 120-3 supports communications with 70 communication devices 123.

Accordingly, handoffs can be used to more evenly distribute a load of corresponding communication devices amongst multiple wireless base stations 120 in the event that one or more wireless channels become unavailable due to use by an incumbent (higher priority) user.

Figure 10:
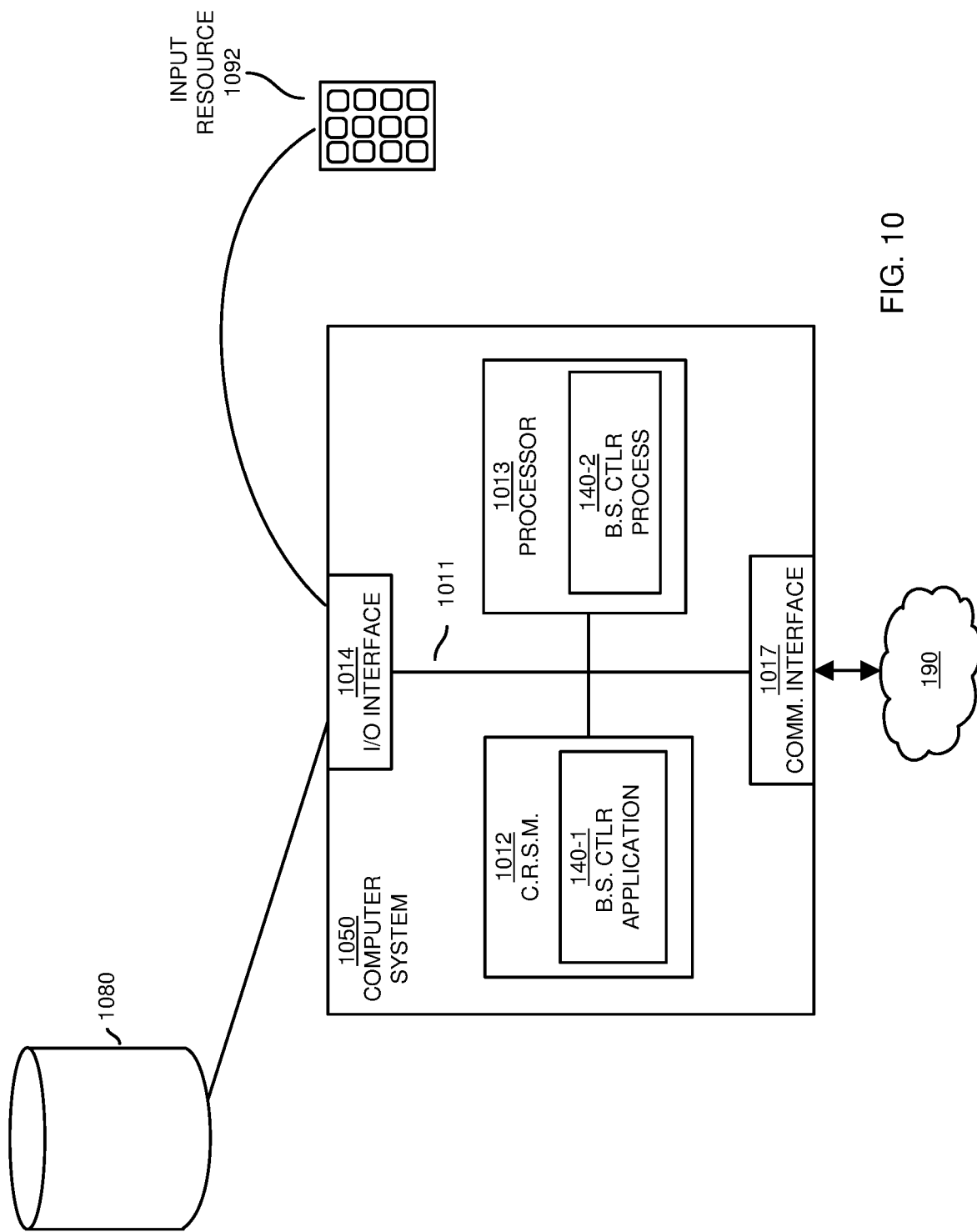
FIG. 10 is a diagram illustrating example computer architecture (hardware) to execute operations according to embodiments herein.

FIG. 10 is an example block diagram of a computer system for implementing any of the operations as discussed herein according to embodiments herein.

Any of the resources (such as spectrum controller 135, base station controller 140, wireless base stations 120, mobile communication devices 121, 122, 123, etc.) as discussed herein can be configured to include a processor (hardware) and executable instructions to carry out the different operations as discussed herein.

As shown, computer system 1050 (such as a respective server resource) of the present example includes an interconnect 1011 coupling computer readable storage media 1012 such as a non-transitory type of media (such as hardware storage medium) in which digital information can be stored and retrieved, a processor 1013 (hardware), I/O interface 1014, and a communications interface 1017. I/O interface 1014 supports connectivity to repository 1080 and input resource 1092.

Computer readable storage medium 1012 can be any suitable type of hardware storage device such as memory, optical storage, hard drive, floppy disk, etc. In one embodiment, the computer readable storage medium 1012 (hardware such as one or more devices) stores instructions and/or data.

As shown, computer readable storage media 1012 can be encoded with base station controller application 140-1 (e.g., including instructions) to carry out any of the operations as discussed herein associated with base station controller 140.

During operation of one embodiment, processor 1013 accesses computer readable storage media 1012 via the use of interconnect 1011 in order to launch, run, execute, interpret or otherwise perform the instructions in base station controller application 140-1 stored on computer readable storage medium 1012. Execution of the base station controller application 140-1 produces base station controller process 140-2, which carries out any of the operations and/or processes as discussed herein.

Those skilled in the art will understand that the computer system 1050 can include other processes and/or software and hardware components, such as an operating system that controls allocation and use of hardware resources to base station controller application 140-1.

In accordance with different embodiments, note that computer system may be or included in any of various types of devices, including, but not limited to, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. Note that the computer system 1050 may reside at any location or can be included in any suitable resource in any network environment to implement functionality as discussed herein.

Functionality supported by the different resources will now be discussed via flowcharts in FIGS. 11-13. Note that the steps in the flowcharts below can be executed in any suitable order.

Figure 11:
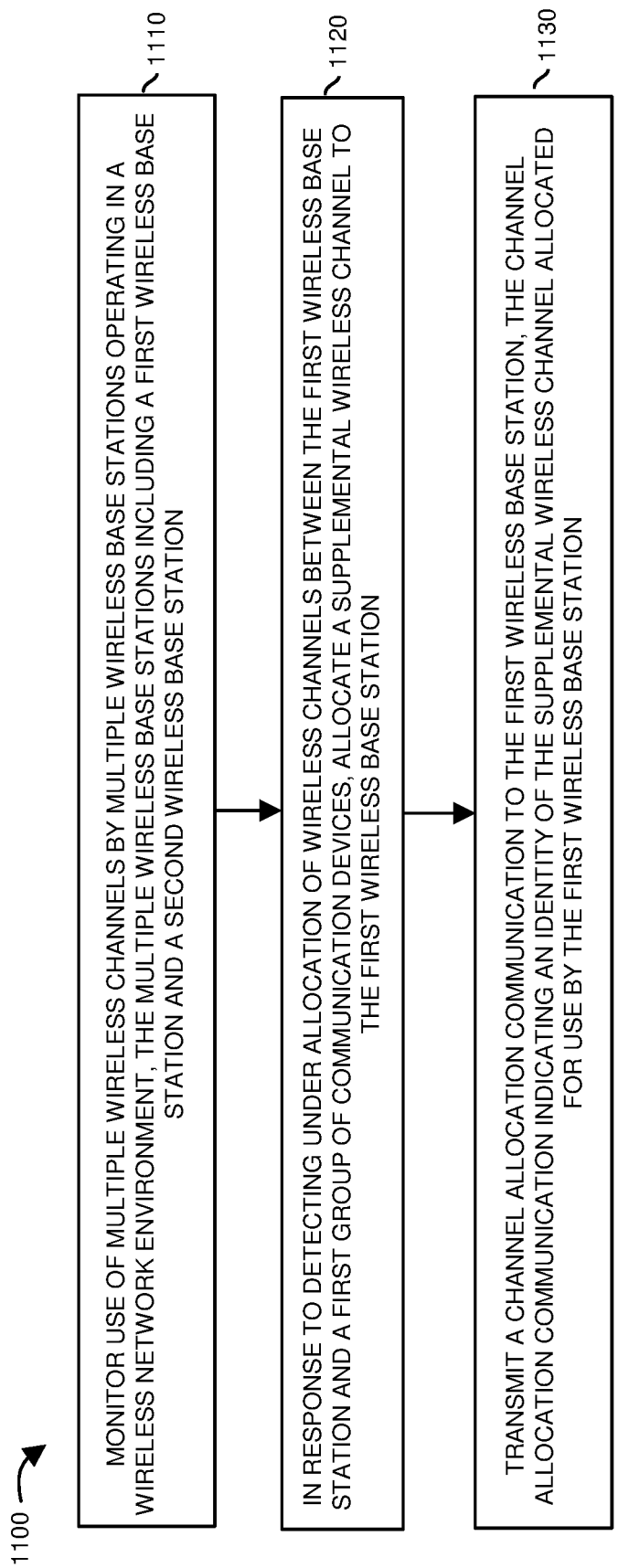
FIG. 11 is an example diagram illustrating a method according to embodiments herein.

FIG. 11 is a flowchart 1100 illustrating an example method according to embodiments herein. Note that there will be some overlap with respect to concepts as discussed above.

In processing operation 1110, the base station controller 140 monitors multiple wireless base stations 120 operating in a wireless network environment 100. The multiple wireless base stations 120 include a first wireless base station 120-1 and a second wireless base station 120-2.

In processing operation 1120, in response to detecting under allocation (such as caused by communication congestion) of wireless channels between the first wireless base station 120-1 and a first group of communication devices 121, the base station controller 140 allocates a supplemental wireless channel to the first wireless base station 120-1.

In processing operation 1130, the base station controller 140 transmits a channel allocation communication to the first wireless base station 120-1, the channel allocation communication indicates an identity of the supplemental wireless channel allocated for use by the first wireless base station 120-1.

Figure 12:
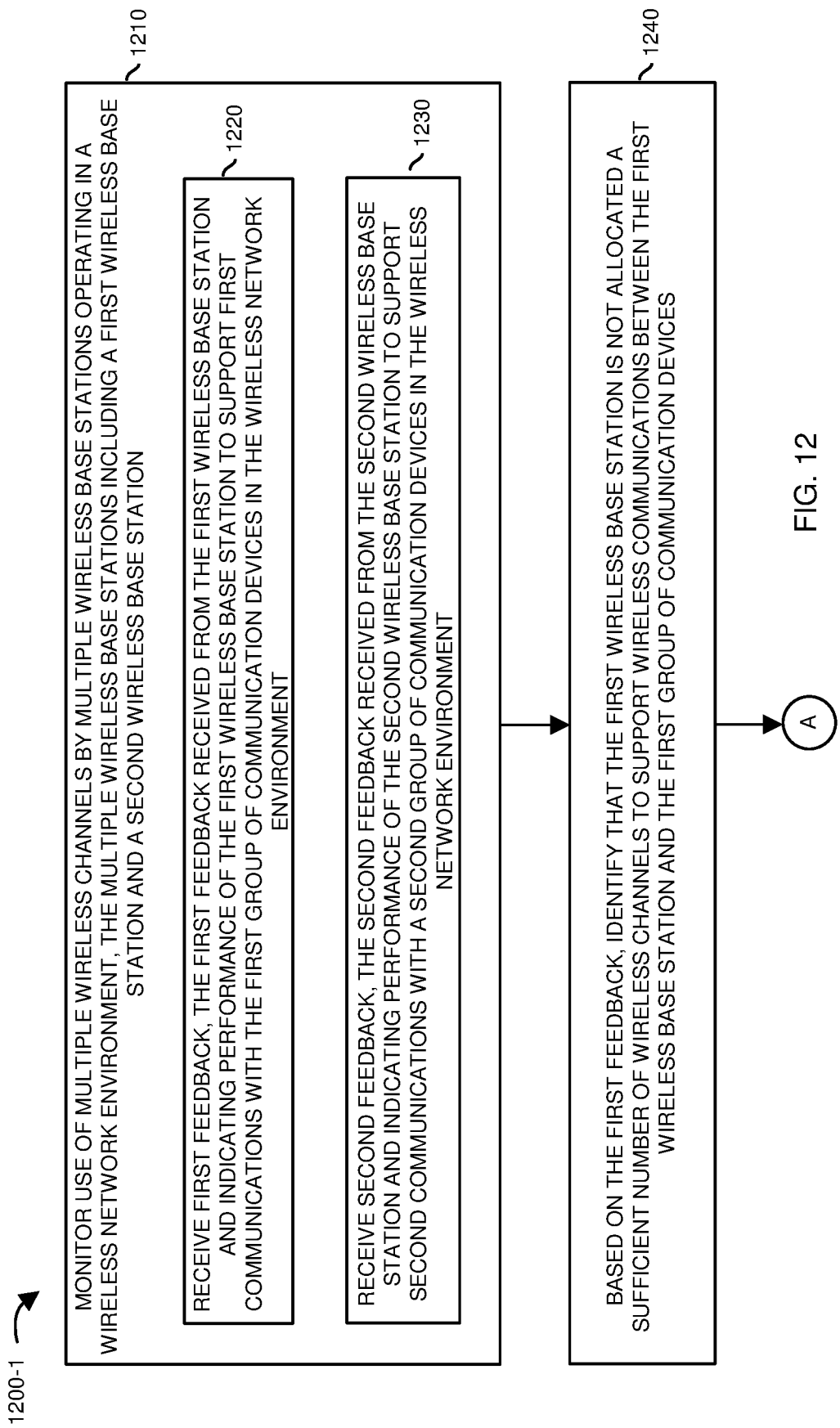
FIGS. 12 and 13 combine to illustrate an example method according to embodiments herein.
Figure 13:
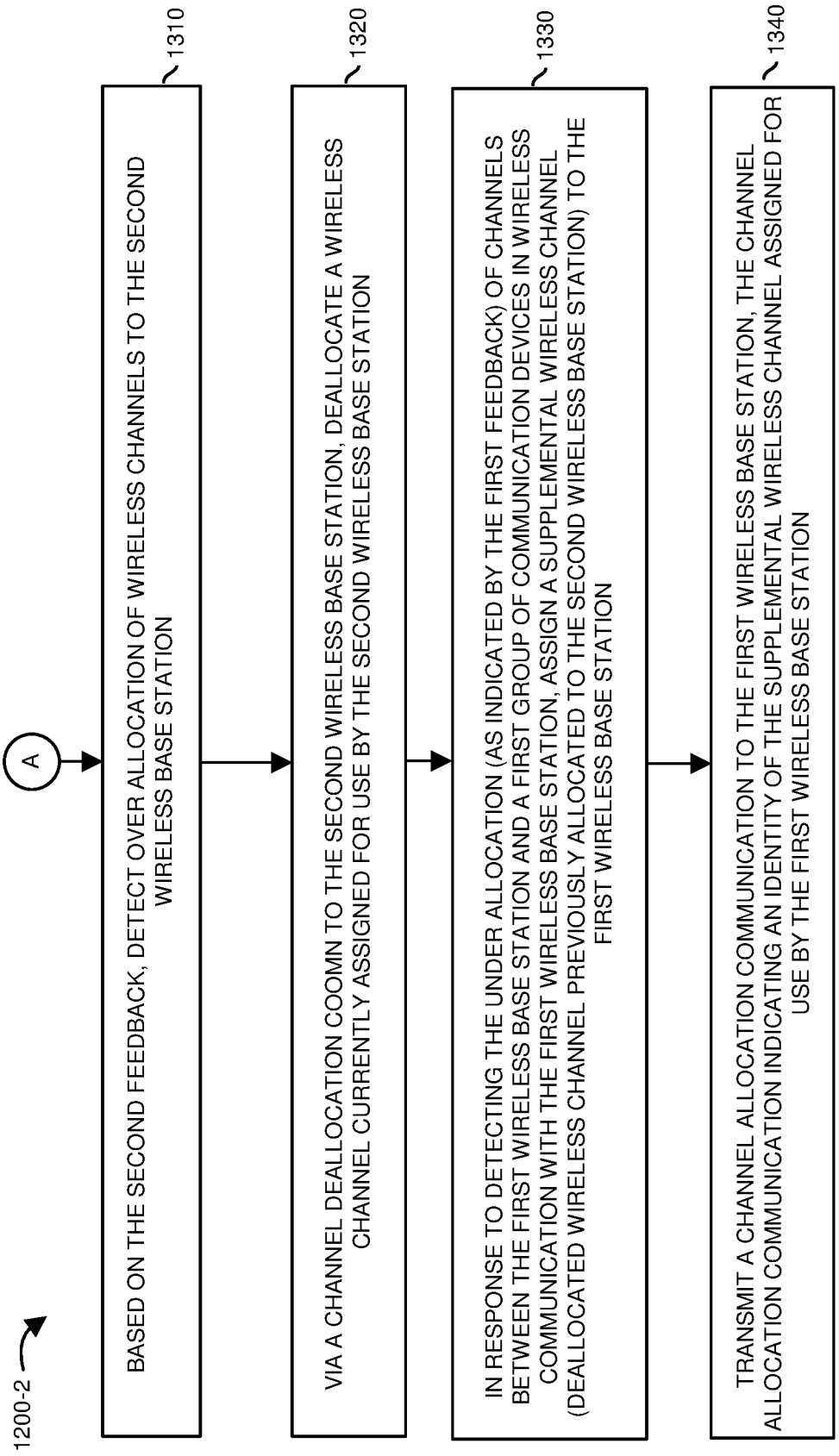

FIGS. 12 and 13 is a flowchart 1200 (such as flowchart 1200-1 and flowchart 1200-2) illustrating an example method according to embodiments. Note that there will be some overlap with respect to concepts as discussed above.

In processing operation 1210, the base station controller 140 monitors multiple wireless base stations 120 operating in a wireless network environment 100. The multiple wireless base stations 120 include a first wireless base station 120-1 and a second wireless base station 120-2.

In processing sub-operation 1220, the base station controller 140 receives first feedback 411 indicating performance of the first wireless base station 120-1 and its ability to support first communications with the first group of communication devices 121 in the wireless network environment 100.

In processing sub-operation 1230, the base station controller 140 receives second feedback 412 indicating performance of the second wireless base station 120-2 and its ability to support second communications with a second group of communication devices 122 in the wireless network environment 100.

In processing operation 1240, based on the first feedback 411, the base station controller 140 identifies that the first wireless base station 120-1 is not allocated a sufficient number of wireless channels to support wireless communications (above a threshold performance level) between the first wireless base station 120-1 and the first group of communication devices 121.

In processing operation 1310 in flowchart 1200-2 of FIG. 13, based on the second feedback 412, the base station controller 140 detects over allocation of wireless channels to the second wireless base station controller 120-2. In other words, wireless base station has more wireless channels assigned to it than is needed to provide wireless communications above a performance threshold level.

In processing operation 1320, via a channel de-allocation communication to the second wireless base station 120-2, the base station controller 140 allocates a wireless channel currently assigned for use by the second wireless base station 120-2.

In processing operation 1330, in response to detecting the under allocation (as indicated by the first feedback 411) of channels between the first wireless base station 120-1 and a first group of communication devices 121 in wireless communication with the first wireless base station 120-1, the base station controller 140 assigns a supplemental wireless channel (such as the de-allocated wireless channel previously allocated to the second wireless base station) to the first wireless base station 120-1.

In processing operation 1340, the base station controller 140 transmits a channel allocation communication to the first wireless base station 120-1. The channel allocation communication indicates an identity of the supplemental wireless channel newly assigned for use by the first wireless base station 120-1.

Note again that techniques herein are well suited to support allocation/de-allocation of wireless channels in wireless network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

I claim:

1. A method comprising:
monitoring multiple wireless base stations operating in a wireless network environment, the multiple wireless base stations including a first wireless base station and a second wireless base station;
in response to detecting under allocation of wireless channels to support wireless communications between the first wireless base station and a first group of communication devices, allocating a supplemental wireless channel to the first wireless base station; and
transmitting a communication to the first wireless base station, the communication indicating an identity of the supplemental wireless channel allocated for use by the first wireless base station;
wherein the supplemental wireless channel is one of multiple wireless channels in a multi-tier wireless band, the multi-tier wireless band further including a first wireless channel and a second wireless channel in addition to the supplemental wireless channel;
wherein the supplemental wireless channel is a non-licensed wireless channel available for use when not in use by a higher priority entity than the first wireless base station; and
wherein the first wireless base station is allocated use of the supplemental wireless channel and the first wireless channel.

2. The method as in claim 1 further comprising:
de-allocating a wireless channel from the second wireless base station; and
assigning the de-allocated wireless channel as the supplemental wireless channel allocated to the first wireless base station.

3. The method as in claim 1, wherein monitoring the multiple wireless base stations in the wireless network environment includes:
receiving first feedback, the first feedback received from the first wireless base station, the first feedback indicating performance of the first wireless base station to support first communications with the first group of communication devices in the wireless network environment; and
receiving second feedback, the second feedback received from the second wireless base station, the second feedback indicating performance of the second wireless base station to support second communications with a second group of communication devices in the wireless network environment.

4. The method as in claim 1 further comprising:
detecting over allocation of wireless channels to the second wireless base station;
in response to detecting the over allocation and the under allocation: i) deallocating a wireless channel currently assigned for use by the second wireless base station, ii) assigning the deallocated wireless channel as the supplemental wireless channel for use by the first wireless base station.

5. The method as in claim 4 further comprising:
de-allocating the wireless channel from the second wireless base station in response to detecting that a remaining set of wireless channels assigned to the second wireless base station are sufficient to support communications with a second group of communication devices above a performance threshold.

6. The method as in claim 4 further comprising:
de-allocating the wireless channel from the second wireless base station in response to detecting that no alternative wireless channels are available to allocate to the first wireless base station.

7. The method as in claim 1, wherein the first wireless base station and the second wireless base station communicate with respective communication devices via bandwidth available in a multi-tier wireless band.

8. The method as in claim 1, wherein the first wireless base station and the second wireless base station communicate with respective communication devices via LTE (Long Term Evolution) communications.

9. The method as in claim 1, wherein the first wireless base station uses the supplemental wireless channel to communicate with the communication devices in the first group.

10. The method as in claim 1, wherein the supplemental wireless channel de-allocated and allocated for use in the wireless network environment is a wireless channel selected from the CBRS (Citizen Band Radio Spectrum) band.

11. A system comprising:
a first wireless base station;
a second wireless base station;
a base station controller operable to:
monitor use of multiple wireless channels by multiple wireless base stations operating in a wireless network environment, the multiple wireless base stations including the first wireless base station and the second wireless base station;
in response to detecting under allocation of wireless channels used to communicate between the first wireless base station and a first group of communication devices in wireless communication with the first wireless base station, assign a supplemental wireless channel to the first wireless base station; and
transmit a communication to the first wireless base station, the communication indicating an identity of the supplemental wireless channel assigned for use by the first wireless base station;
wherein the supplemental wireless channel is one of multiple wireless channels in a multi-tier wireless band, the multi-tier wireless band further including a first wireless channel and a second wireless channel in addition to the supplemental wireless channel;
wherein the supplemental wireless channel is a non-licensed wireless channel available for use when not in use by a higher priority entity than the first wireless base station; and
wherein the first wireless base station is allocated use of the supplemental wireless channel and the first wireless channel.

12. The system as in claim 11, wherein the base station controller is further operable to:
de-allocate a wireless channel from the second wireless base station; and
assign the de-allocated wireless channel as the supplemental wireless channel allocated to the first wireless base station.

13. The system as in claim 11, wherein the base station controller is further operable to:
receive first feedback, the first feedback received from the first wireless base station, the first feedback indicating performance of the first wireless base station to support first communications with the first group of communication devices in the wireless network environment; and
receive second feedback, the second feedback received from the second wireless base station, the second feedback indicating performance of the second wireless base station to support second communications with a second group of communication devices in the wireless network environment.

14. The system as in claim 11, wherein the base station controller is further operable to:
de-allocate a wireless channel currently assigned for use by the second wireless base station; and
assign the de-allocated wireless channel as the supplemental wireless channel for use by the first wireless base station.

15. The system as in claim 14, wherein the base station controller is further operable to:
de-allocate the wireless channel from the second wireless base station in response to detecting that a set of remaining allocated wireless channels assigned to the second wireless base station are sufficient to support communications with a second group of communication devices above a performance threshold.

16. One or more computer-readable storage devices having instructions stored thereon, the instructions, when carried out by computer processor hardware, cause the computer processor hardware to:
monitor use of multiple wireless channels by multiple wireless base stations operating in a wireless network environment, the multiple wireless base stations including a first wireless base station and a second wireless base station;
in response to detecting congestion of communications between the first wireless base station and a first group of communication devices in wireless communication with the first wireless base station, assign a supplemental wireless channel to the first wireless base station; and
transmit a communication to the first wireless base station, the communication indicating an identity of the supplemental wireless channel assigned for use by the first wireless base station;
wherein the supplemental wireless channel is one of multiple wireless channels in a multi-tier wireless band, the multi-tier wireless band further including a first wireless channel and a second wireless channel in addition to the supplemental wireless channel; and
wherein the supplemental wireless channel is a non-licensed wireless channel available for use when not in use by a higher priority entity than the first wireless base station; and
wherein the first wireless base station is allocated use of the supplemental wireless channel and the first wireless channel.

17. A method comprising:
monitoring multiple wireless base stations operating in a wireless network environment, the multiple wireless base stations including a first wireless base station and a second wireless base station;
in response to detecting under allocation of wireless channels to support wireless communications between the first wireless base station and a first group of communication devices, allocating a supplemental wireless channel to the first wireless base station; and
transmitting a communication to the first wireless base station, the communication indicating an identity of the supplemental wireless channel allocated for use by the first wireless base station;
wherein the first wireless base station and the second wireless base station communicate with respective communication devices via bandwidth available in a multi-tier wireless band;
wherein the under allocation of the wireless channels include a first set of wireless channels allocated to the first wireless base station, the first set of wireless channels allocated from the multi-tier wireless band, the first set of wireless channels including a first wireless channel and the supplemental wireless channel; and
wherein the supplemental wireless channel is assigned for on-demand use by an entity having a higher priority than the first wireless base station, the supplemental wireless channel temporarily allocated for use by the first wireless base station in response to non-use of the supplemental wireless channel by the entity having the higher priority than the first wireless base station.

18. A method comprising:

monitoring multiple wireless base stations operating in a wireless network environment, the multiple wireless base stations including a first wireless base station and a second wireless base station;

in response to detecting under allocation of wireless channels to support wireless communications between the first wireless base station and a first group of communication devices, allocating a supplemental wireless channel to the first wireless base station; and transmitting a communication to the first wireless base station, the communication indicating an identity of the supplemental wireless channel allocated for use by the first wireless base station;

wherein the supplemental wireless channel is allocated from a multi-tier wireless band including a first wireless channel and the supplemental wireless channel, the method further comprising:

monitoring use of the first wireless channel and the supplemental wireless channel in the multi-tier wireless band; and wherein allocating the supplemental wireless channel includes detecting that the supplemental wireless channel is currently not used by an incumbent user having a higher priority assignment for use of the supplemental wireless channel than the first wireless base station.

19. The method as in claim 18, wherein monitoring use of the first wireless channel and the supplemental wireless channel in the multi-tier wireless band includes:

tracking statuses of available, unavailable, and allocated wireless channels in the multi-tier wireless band; and in response to receiving notification that the supplemental wireless channel is no longer available in multi-tier wireless band due to scheduled use of the supplemental wireless channel to a higher priority user than the first wireless base station, de-allocating the supplemental wireless channel from the first wireless base station.

20. A method comprising:

monitoring multiple wireless base stations operating in a wireless network environment, the multiple wireless base stations including a first wireless base station and a second wireless base station;

in response to detecting under allocation of wireless channels to support wireless communications between the first wireless base station and a first group of communication devices, allocating a supplemental wireless channel to the first wireless base station; and transmitting a communication to the first wireless base station, the communication indicating an identity of the supplemental wireless channel allocated for use by the first wireless base station;

the method further comprising:

detecting over allocation of wireless channels to the second wireless base station;

in response to detecting the over allocation and the under allocation: i) deallocating a wireless channel currently assigned for use by the second wireless base station, ii) assigning the deallocated wireless channel as the supplemental wireless channel for use by the first wireless base station; and wherein a first wireless channel is assigned for use by the first wireless base station;

wherein the first wireless channel and the supplemental wireless channel are allocated from a multi-tier wireless band including the first wireless channel and a second wireless channel, the method further comprising:

monitoring use of the first wireless channel and the supplemental wireless channel in the multi-tier wireless band; and wherein allocating the wireless channel includes detecting that the supplemental wireless channel is not used by an incumbent user having a higher priority than the first wireless base station.

21. The method as in claim 20, wherein monitoring use of the first wireless channel and the supplemental wireless channel in the multi-tier wireless band includes:

tracking statuses of wireless channels in the multi-tier wireless band as being available, unavailable, and allocated wireless channels in the multi-tier wireless band;

in response to receiving notification that the supplemental wireless channel is no longer available in the multi-tier wireless band due to scheduled use of the supplemental wireless channel to a higher priority entity than the first wireless base station, de-allocating the supplemental wireless channel from the first wireless base station; and tracking a status of the supplemental wireless channel as being unavailable for use by the first wireless base station and the second wireless base station.

22. The method as in claim 21 further comprising:

in response to a condition in which the supplemental wireless channel is no longer available for allocation in the wireless network environment due to usage of the supplemental wireless channel by the higher priority entity than the first wireless base station, initiating handoffs amongst the first wireless base station and the second wireless base station to accommodate unavailability of the supplemental wireless channel.

23. The method as in claim 22, wherein detecting the under allocation includes: receiving first feedback, the first feedback received from the first wireless base station, the first feedback indicating performance of the first wireless base station to support first communications with the first group of communication devices in the wireless network environment; and wherein detecting the over allocation includes: receiving second feedback, the second feedback received from the second wireless base station, the second feedback indicating performance of the second wireless base station to support second communications with a second group of communication devices in the wireless network environment.

24. A method comprising:

monitoring multiple wireless base stations operating in a wireless network environment, the multiple wireless base stations including a first wireless base station and a second wireless base station;

in response to detecting under allocation of wireless channels to support wireless communications between the first wireless base station and a first group of communication devices, allocating a supplemental wireless channel to the first wireless base station; and transmitting a communication to the first wireless base station, the communication indicating an identity of the supplemental wireless channel allocated for use by the first wireless base station;

wherein the supplemental wireless channel is allocated from a multi-tier wireless band including a first wireless channel and the supplemental wireless channel, the supplemental wireless channel and the first wireless channel allocated for use by the first wireless base station to communicate with the first group of communication devices;

wherein the first wireless channel is a licensed wireless channel allocated for use by the first wireless base station, the first wireless base station having higher priority usage rights to use the first wireless channel over a general public user; and wherein the supplemental wireless channel is assigned for on-demand use by an entity having higher priority usage rights than usage rights of both the first wireless base station and the general public user.

25. The method as in claim 24 further comprising:

de-allocating the supplemental wireless channel from the first wireless base station in response to receiving notification of scheduled use by the entity having the higher priority usage rights; and wherein the first wireless base station is afforded continued use of the first wireless channel while the supplemental wireless channel is used by the entity having the higher priority usage rights.

* * * * *